April 11, 1939.　　　O. KUHLER　　　2,153,763
ADJUSTABLE SEAT
Filed Dec. 29, 1936　　　2 Sheets-Sheet 2
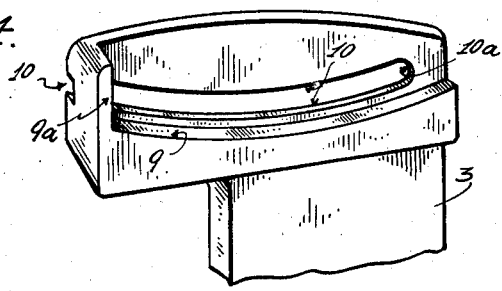
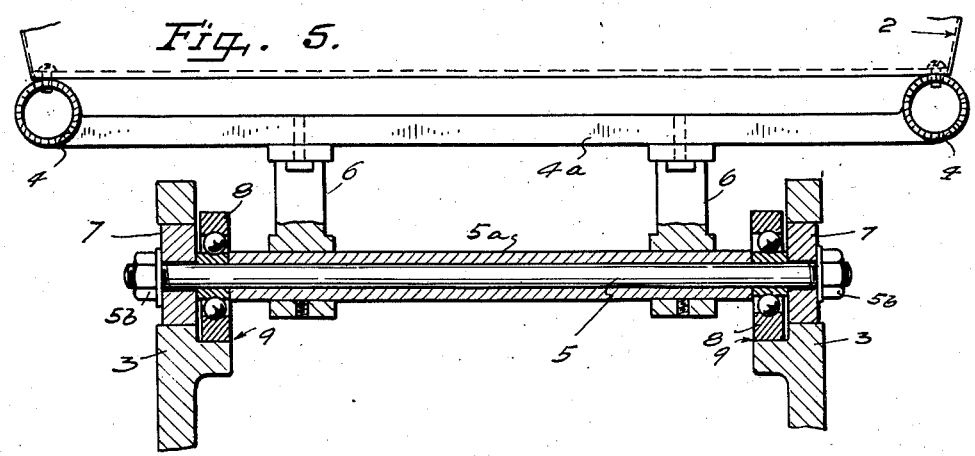
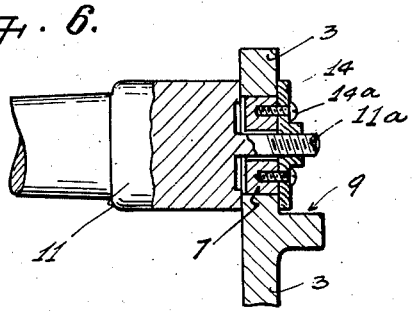
INVENTOR.
Otto Kuhler
BY
ATTORNEY.

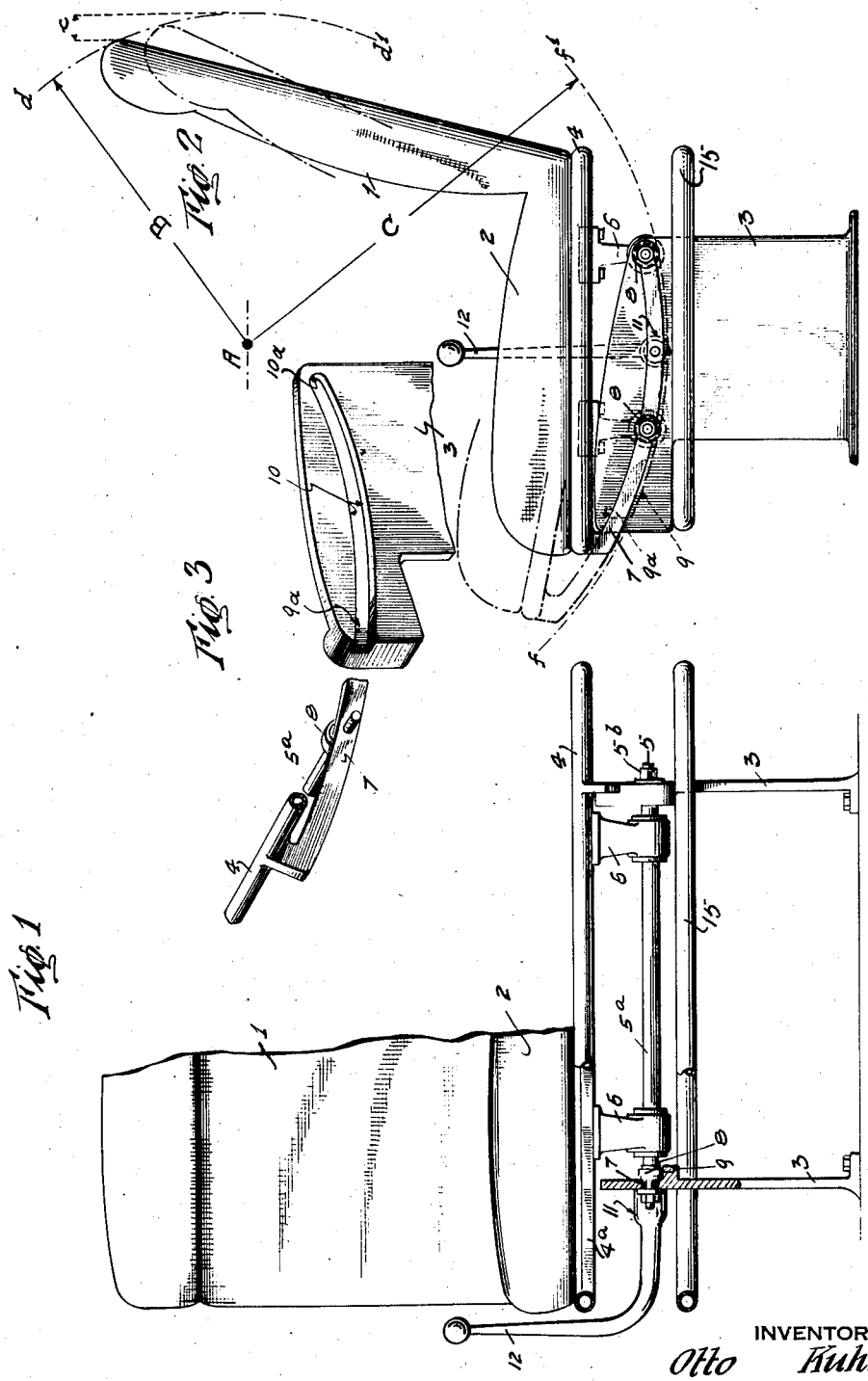

Patented Apr. 11, 1939

2,153,763

UNITED STATES PATENT OFFICE 2,153,763

ADJUSTABLE SEAT

Otto Kuhler, New York, N. Y.

Application December 29, 1936, Serial No. 118,036

1 Claim. (Cl. 155—116)

This invention relates to improvements in chairs and seats and appertains more particularly to adjustable inclining seats, whereby one of the objects is to provide a seat designed and arranged to assure perfect comfort within a minimum of linear space requirements.

Another object is to provide certain adjustable means, permitting the occupant to assume any desired inclined position and to either lock the seat in this position, or freely move forth and back within predetermined limits.

These and other objects are attained by the novel combination of various parts and elements fully described in this specification and illustrated in the accompanying drawings in which:

Figure 1 represents a partly sectional front view of the preferred form of embodiment of this invention.

Figure 2 represents a side view of Figure 1.

Figure 3 is an exploded view showing the guide and supporting members.

Figure 4 is a perspective view of the vertical supporting member opposite from that shown in Figure 3.

Figure 5 represents an enlarged sectional view of the assembled guide and roller members.

Figure 6 shows an enlarged detailed view of the clutch mechanism.

Similar numerals refer to similar parts throughout the various drawings.

Economy of space becomes a vital factor whenever a large number of persons must be accommodated, as experienced in busses, railways, airplanes etc. thus the provision of a comfortable and adjustable seat within very limited space is of utmost importance.

To effectively solve the problem of providing a seat combining utmost comfort, ease of operation and minimum of space, certain features in the construction of an adjustable seat have been conceived and illustrated in their preferred form in Figures 1 and 2.

Assuming a human being in sitting position and the approximate location of the stomach A being made the pivot-center about which back-rest member 1 and seat member 2 rotate, it may be noted that quite a considerable angular displacement of the body is possible without affecting the region of the stomach. For this reason the common stomach and pivot center A is made the center of radius B of the vertically moving back-rest member 1, travelling along curved line $d$—$d1$. The same applies to radius C of the horizontally moving seat member 2, travelling along curved line $f$—$f1$. A maximum of up and down or vertical motion of back-rest member 1, within a minimum of horizontal displacement c, is readily attained by permitting an equal angular travel above and below the horizontal line of radius B, see Figure 2. To confine this vertical motion within the prescribed limits, provision is made for a guide and track structure operating parallel to curved line $f$—$f1$, of radius C. This guide and track arrangement is intended to form an intermediate structure between the seat member 2 and a pair of oppositely positioned stationary supporting members 3.

Seat member 2 and back-rest member 1 form one unit rigidly fastened upon a preferably tubular frame structure 4. A pair of curved guide members 7 and a pair of cross braces 4a, suitably disposed and fastened upon the tubular frame 4, also present a part of the tubular frame structure. It may be pointed out that only one end of curved guide members 7 is joined to frame 4, while the other end is open for the purpose of engaging slot 10. Each of the cross braces 4a carries a shaft and roller combination by means of intermediate hangers 6, see Figures 1 and 5. The shaft and roller combination comprises a shaft 5, a spacer sleeve 5a, and a pair of ball bearing wheels or rollers 8. The ends of shaft 5 are threaded and pass through perforations in guide members 7 and are securely fastened to same by nuts 5b. Frame 4, curved guide members 7, shaft 5, and wheels 8 are thus interconnected and form the under part of seat member 2. This seat assembly is, in turn, supported by a pair of oppositely positioned stationary supporting or foot members 3 whose lower ends are suitably flanged to provide feet permitting the permanent mounting of members 3 upon a base or floor.

To further insure stability and rigidity these stationary supporting members 3 are surrounded by and fastened to another tubular frame 15. The upper ends of members 3, see Figures 3 and 4, are arranged to movably support the lower members of the seat structure whereby the open ended slots 10 slidingly engage the curved guide members 7, while the closed ends 10a serve as stops to terminate the backward motion of guide members 7. Parallel to curved slots 10, curved tracks 9 are positioned and engage wheels 8. Tracks 9 terminate into abutments 9a to stop the forward motion of wheels 8.

The seat structure and the stationary supporting members 3 are assembled as follows:

Assuming the stationary supports 3 are properly spaced and mounted and also assuming the seat structure assembled, with the exception of shafts 5 and wheels 8; the curved guide members 7 can be readily inserted into slots 10. Now wheels 8, may be placed in their proper position upon tracks 9 and each shaft 5 inserted through a hole provided for this purpose in guide members 7, engaging wheel 8, sleeve 5a, the opposite wheel 8 and finally through the hole in the opposite guide member 7. Nuts 5b, being placed in position, serve to securely lock shafts 5 in their respective location.

With this assemly the seat structure can be freely swung forth and back within its prescribed limits, the forward movement being terminated by rollers 8 hitting abutments 9a, the backward movement terminated by the free ends of curved guide members 7 hitting the closed ends 10a, of the curved slots 10.

Figure 6 shows an enlarged and partly sectional view of a clutch arrangement permitting the seat structure being locked and held in any desired position. This clutch arrangement comprises a hub portion 11, terminating at one end in a threaded bolt 11a and at the other end in a handle portion 12. A flanged nut 14, rigidly mounted, by screws or other means upon guide member 7, serves to engage threaded bolt 11a, which arrangement pemits hub 11, operated by handle 12, to either clamp against the side of stationary member 3 or be released, thereby locking or unlocking the seat structure to or from the stationary supporting member 3.

While certain novel features of this invention have been disclosed and pointed out in the annexed claim, it will be understood that various omissions, substitutions and changes may be made by those skilled in the art, without departing from the spirit of the invention.

I claim:

An adjustable seat comprising a combined seat and back-rest member, a tubular frame structure mounted upon and supporting said seat member, a pair of curved guide members spacedly disposed upon and depending from said frame structure whereby one end of each guide member is permanently joined to said frame structure while the other end remains free and unconnected, a plurality of wheel members disposed upon and rotatably mounted upon a pair of shafts, and said shafts spacedly connected to the curved guide members, a pair of stationary and oppositely positioned vertical supporting members the upper parts of which are provided with a suitably curved slot and track arrangement to movably engage said curved guides and wheels, a clutch member disposed to engage one of said stationary supporting members and one of said curved guide members comprising a combined hub and handle member and a flanged-nut member, said hub member terminating into a threaded stud engaging said flanged nut member which in turn is securely mounted upon the corresponding curved guide member, and said hub and flanged nut members disposed to engage and disengage with the respective outer and inner sides of said vertical supporting member.

OTTO KUHLER.